United States Patent [19]

Sommer

[11] Patent Number: 5,323,888

[45] Date of Patent: * Jun. 28, 1994

[54] ELECTRICAL ACTUATED MULTI-SPEED DRIVE APPARATUS

[75] Inventor: Gordon M. Sommer, Grosse Pointe Farms, Mich.

[73] Assignee: Sommer Company, Warren, Mich.

[*] Notice: The portion of the term of this patent subsequent to Feb. 15, 2011 has been disclaimed.

[21] Appl. No.: 12,308

[22] Filed: Feb. 2, 1993

Related U.S. Application Data

[63] Continuation-in-part of Ser. No. 920,248, Jul. 27, 1992, Pat. No. 5,285,879.

[51] Int. Cl.$^5$ .............................................. B60K 41/28
[52] U.S. Cl. ................................... 477/74; 192/18 A; 192/18 B; 192/90; 477/71
[58] Field of Search ................. 192/0.094, 18 A, 18 B, 192/90, 0.09, 0.092; 74/661

[56] References Cited

U.S. PATENT DOCUMENTS

| | | | |
|---|---|---|---|
| 4,125,178 | 11/1978 | Monks | 192/18 A |
| 4,494,635 | 1/1985 | Sommer | 192/12 C |
| 4,506,772 | 3/1985 | Sommer | 192/18 A |
| 4,592,251 | 6/1986 | Mason | 192/18 B X |
| 4,616,739 | 10/1986 | Sommer | 192/18 A |
| 4,765,448 | 8/1988 | Sommer | 192/18 A |
| 4,921,078 | 5/1990 | Sommer | 188/171 |
| 5,172,798 | 12/1992 | Mabee | 192/18 B |

Primary Examiner—Leslie A. Braun
Assistant Examiner—Andrea Pitts
Attorney, Agent, or Firm—Harness, Dickey & Pierce

[57] ABSTRACT

There is provided a two-speed drive unit for a motor drive, the motor drive having a housing and a main rotatable member. The two-speed drive unit comprises a two-speed drive housing secured to the motor drive housing and a secondary motor secured to the two-speed drive housing. The motor shaft of the secondary motor extends into the two-speed drive housing. An oil-shear brake, exterior to the secondary motor, is operably attached to the driveshaft of the secondary motor to effect braking. The two-speed drive unit further comprises a gear train operably associated with both the secondary motor shaft and a clutch, the clutch being disposed between the gear train and the rotatable member of the main motor drive for engagement and disengagement of the gear train with the rotatable member of the main motor drive. The clutch is normally engaged by a plurality of coil springs and disengaged by the action of an AC voltage coil. Control means are provided which are capable of determining and storing predetermined positions of the motor drive at which engagement or disengagement of the clutch and brake of the two-speed drive is desired. These positions are constantly monitored and adjusted to maintain the speed and accuracy of the two-speed drive.

15 Claims, 7 Drawing Sheets

ELECTRICAL ACTUATED MULTI-SPEED DRIVE APPARATUS

CROSS REFERENCE TO RELATED APPLICATIONS

This application is a continuation-in-part of U.S. Ser. No. 07/920,248 filed Jul. 27, 1992, entitled "Electrical Actuated Multi-Speed Drive Apparatus" now U.S. Pat. No. 5,285,879, patented Feb. 15, 1994.

BACKGROUND OF THE INVENTION

The present invention relates generally to two-speed drives using computer technology for adaptive control of the unit. More particularly, the present invention relates to a main motor, a clutch and gear set between the main motor and a secondary motor, the secondary motor having a brake.

The present invention has application on a wide variety of machinery requiring either high-speed, precision indexing or feed drives requiring high speed approach to a work piece and then adjustable slow speed to perform an operation on the work piece with a precision stop. Typical applications for the present invention operating in the precision index mode include index tables, transfer bars, positioning drives, index type conveyors, rotary sheet feeders and linear sheet feeders. A typical application for the present invention operating in the high speed approach with a slow speed work cycle is the feed drive for the machining heads used in automated transfer machining lines.

Various two-speed drive units have been developed for the above applications but all require the use of multiple limit switches to control the various sequences of the cycle. These units have two major drawbacks. The first drawback is that the productivity and accuracy of the driven machine depends upon the skill of the setup man and/or operator in the setting of the limit switches. The second drawback is the positioning accuracy of the various elements of the complete system. In essence, limit switches determine when a certain function will start. The resulting position at which the function is completed is thus variable due to small changes such as frictional load on the driven machine and the effects of ambient, machine and drive temperatures. With the present invention, the position where a function is to be completed is given to the computer and the computer determines on a cycle-to-cycle basis when each function of a multi-function cycle is to start.

Prior art two speed drive systems have been used in indexing applications only when absolutely necessary in order to achieve better positioning accuracy than is possible with a single speed system. The reason for this is the loss of productivity when using a two speed drive system due to the system operating at the slower speed for a portion of its cycle. Accordingly, it is one object of the present invention to increase the productivity of the driven machine using a two speed drive system to nearly the same productivity as with a single speed system by minimizing the time the system operates at the slower speed. Another object of the present invention is to increase the final positioning accuracy.

Two speed drives are also commonly used for the feed drive of machining heads in automated lines. Another object of the present invention is to more accurately position the machining head at high speed to a position just before the work piece is contacted thus increasing productivity. In order to achieve depth control of the tools machining the work piece, it is often necessary to build stops into the machine. The necessity to do this causes additional problems due to the sudden stopping of the machine and the machine's inertia. Another object of the present invention is to increase the accuracy of depth control of the tools so the stops are no longer necessary thus eliminating the sudden stopping of the machine.

Another object of the present invention is to provide a two speed drive that can also be used as a single speed drive unit without mechanical modifications. Another object of the present invention is to use the same mechanical control equipment in a wide variety of applications without user programming. This is achieved by inserting a different preprogrammed EPROM into the control board.

Another object of the present invention is to eliminate the use of compressed air that is used on many other prior art two speed drives. Experience shows that 4014 60 percent of all maintenance problems are caused by dirty or improper air supplies.

Further objects of the present invention are to provide an improved two speed drive system that is simple and compact in design, economical to produce and extremely rugged and maintenance free during operation.

Further objects, features and advantages of the present invention will become apparent from the analysis of the following written specification, the accompanying drawings and the appended claims.

DETAILED DESCRIPTION OF THE PREFERRED EMBODIMENT

Referring to FIGS. 1-4, a main motor drive unit 10 is illustrated which incorporates a two-speed drive unit 12 of the present invention. An adaptor plate 14 is secured to the rear of main motor drive unit 10 by a plurality of circumferentially spaced bolts 16. Adaptor plate 14 has a centrally located circular bore 18 which allows access to the rear of a main motor shaft 20 of main motor drive unit 10. Main motor shaft 20 extends through bore 18 for attachment to two-speed drive unit 12 as will be described later herein.

Two-speed drive unit 12 comprises a secondary motor 22, a secondary motor brake 24, a clutch 26 for engaging secondary motor 22 with the rear of main motor shaft 20 of main motor drive unit 10 to drive a machine (not shown) via main motor shaft 20 and a controlling computer 33 which is in communication with an encoder 28 for determining the position of the member driven by main motor shaft 20 at all times. Clutch 26 is enclosed by an oil-filled housing assembly 30 comprised of a clutch control housing 32, an intermediate housing 34, an annular housing 36, and an end cap 38. Intermediate housing 34 is formed by a first end wall 40, an annular wall 42 and a second end wall 44. Intermediate housing 34 is secured to adaptor plate 14 by a plurality of circumferentially spaced bolts 46. End cap 38 is located in a bore 48 in first end wall 40 and is secured to first end wall 40 by a plurality of circumferentially spaced bolts 50 and a suitable oil seal 52. The annular housing 36 is located in a bore 54 in second end wall 44 and is secured to second end wall 44 at its lower periphery by a plurality of circumferentially spaced bolts 55 and a suitable oil seal 56. Clutch control housing 32 is secured to the opposite end of annular housing 36 by a plurality of circumferentially spaced bolts 58 and a suitable oil seal 60. Encoder 28 is located in a bore 62 in clutch control housing 32 and is secured to the outside of clutch control housing 32 by a plurality of circumferentially spaced bolts 64.

Figure 1:
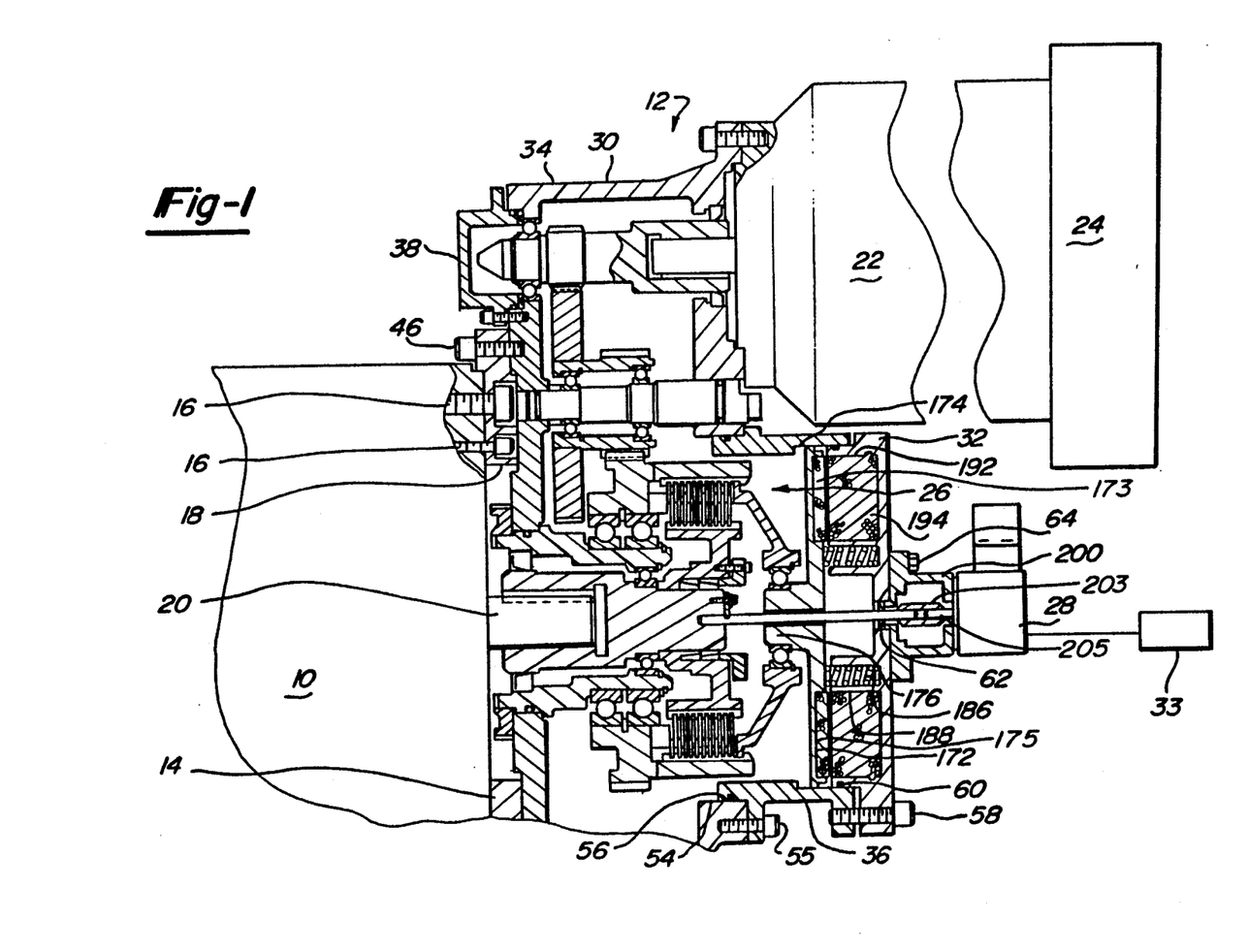
FIG. 1 is a longitudinal side sectional view partially in cross section of the two-speed drive unit of the present invention.
Figure 2:
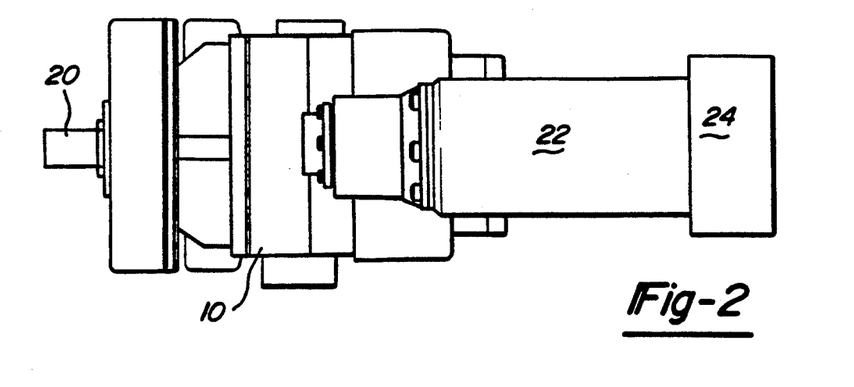
FIG. 2 is a top view of the two-speed drive unit shown in FIG. 1.

Secondary motor 22 and secondary motor brake 24 are located in a bore 66 in second end wall 44 and are secured by bolts 68 to second end wall 44 with a motor shaft 70 of secondary motor 22 extending into housing assembly 30. Secondary motor brake 24 is an electroshear brake of a design well known in the art and is connected to motor shaft 70 such that when there is no power supplied to secondary motor brake 24, secondary motor brake 24 is in the applied condition thus prohibiting motor shaft 70 from rotating. When power is supplied to secondary motor brake 24, secondary motor brake 24 is released.

Figure 3:
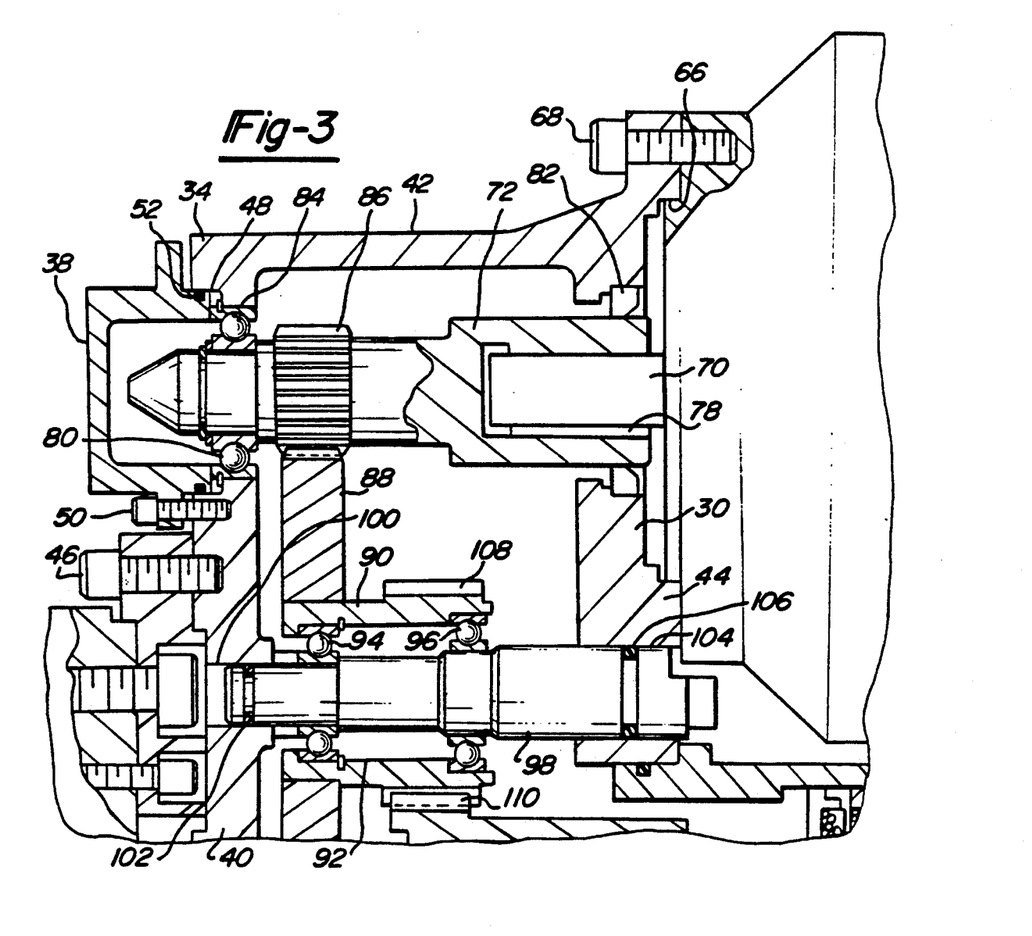
FIG. 3 is an enlarged view of the gearing used for the two-speed drive shown in FIG. 1.

Driveshaft 70 telescopically engages an interior drive shaft 72 via a key way 78 on motor shaft 70. Interior shaft 72 is rotatably mounted within housing assembly 30 by a bearing 80 and appropriately sealed at the secondary motor end by a seal 82. Bearing 80 is mounted in a bore 84 in first end wall 40. End cap 38 provides the necessary clearance for interior shaft 72 to extend through bearing 80 and first end wall 40 of intermediate housing 34. A pinion gear 86 is disposed on interior shaft 72 and is rotatable therewith. Pinion gear 86 meshes with a first gear 88 which is mounted on a sleeve 90 wherein pinion gear 86 rotatably drives sleeve 90 via gear 88. Sleeve 90 has an internal bore 92 within which two bearings 94 and 96 are disposed. A non-rotating support shaft 98 extends from a bore 100 having a suitable seal 102 in first end wall 40 through bearings 94 and 96 into a bore 104 also having a seal 106 in oppositely disposed second end wall 44 of housing assembly 30 to support sleeve 90.

Sleeve 90 has a second gear 108 fixedly disposed at the outer periphery thereof, rotatable with sleeve 90, axially spaced from first gear 88, and generally having a different (smaller) diameter than first gear 88. This second gear 108 meshingly engages the teeth 110 of a first annular member 112. First annular member 112 has an interior bore 114 within which is disposed a pair of bearings 116 and 118 separated by a snap ring 120. Bearings 116 and 118 are mounted in an annular recess 122 around the outer periphery of an axially extending stationary annular sleeve 124 affixed to the inner periphery of bore 126 in first end wall 40 with a suitable seal 128 at the interface of first end wall 40 and sleeve 124. The interface comprises an annular groove 130 within which first end wall 40 is inserted. Either first end wall 40 or sleeve 124 are comprised of multiple pieces to facilitate assembly.

Figure 4:
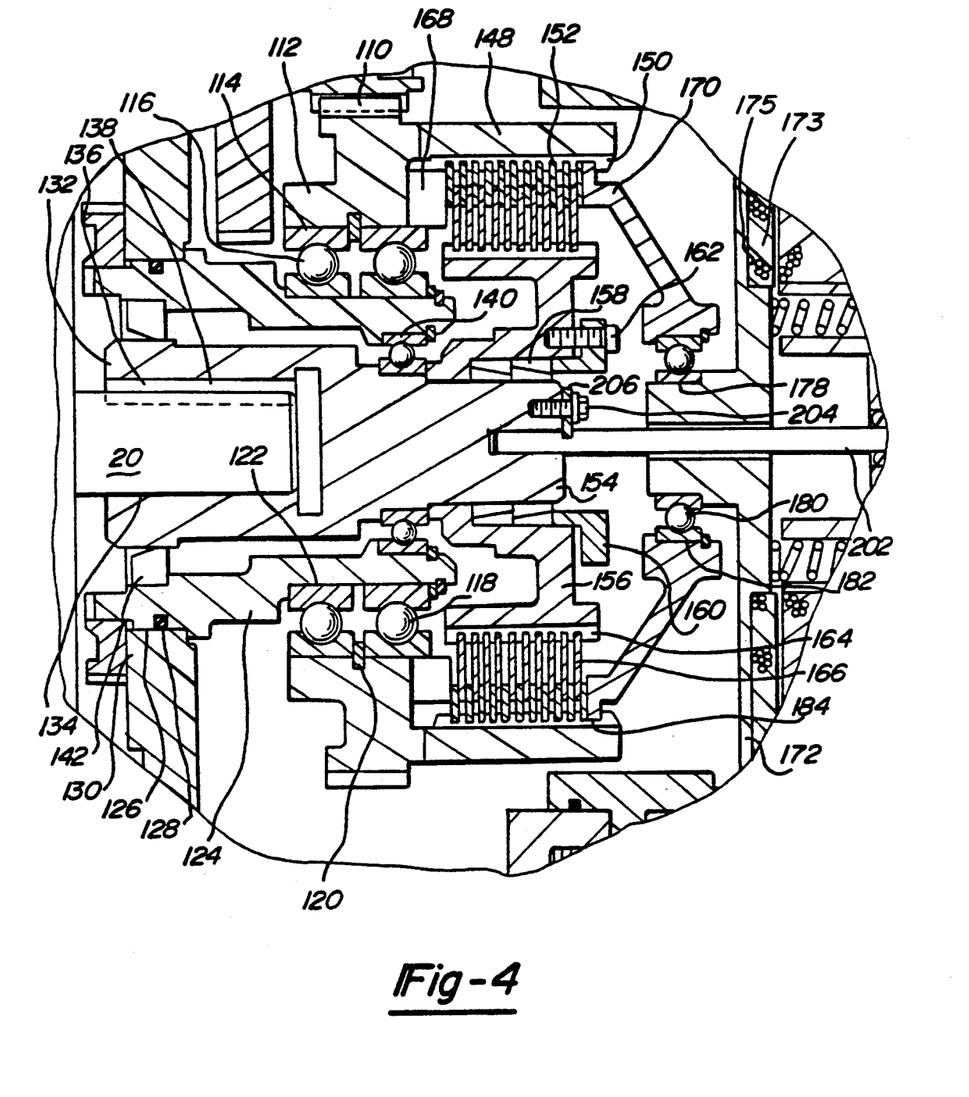
FIG. 4 is an enlarged view of the oil submerged clutch for the two-speed drive unit shown in FIG. 1.

A cylindrical power transmitting member 132 disposed within sleeve 124 encapsulates and is connected to main motor shaft 20 within bore 134 of member 132. Member 132 has a key 136 which is inserted within a key way 138 in main motor shaft 20. Cylindrical member 132 is rotatably mounted within sleeve 124 by bearing 140 and appropriately sealed at its opposite end by a seal 142 which is disposed between sleeve 124 and cylindrical member 132.

Clutch 26 includes an extended annular portion 148, integral with first annular member 112, having a plurality of longitudinally extending circumferentially spaced splines 150 disposed at the inner periphery thereof. A series of friction clutch plate members, generally designated 152, are each provided with internal spline teeth complimentary to splines 150 and adapted for splined engagement therewith.

Cylindrical power transmitting member 132 includes a cylindrical extended portion 154 which has an annular power transmitting member 156 fixedly disposed at the outer periphery thereof, rotatable with portion 154. Member 156 is fixedly attached to extended portion 154 by a pair of wedges 158 which are locked between extended portion 154 and member 156 by an annular compression ring 160. Compression ring 160 is secured to annular member 156 by a plurality of circumferentially spaced bolts 162. Annular power transmitting member 156 has a plurality of longitudinally extending circumferentially spaced splines 164 disposed at the radially outer periphery thereof. A series of friction clutch disc members, generally designated 166, are provided with internal spline teeth complimentary to splines 164 and adapted for splined engagement therewith. In assembly, the clutch plates 152 and discs 166 are interleaved between an abutment surface 168 and an engagement member 170 to be capable of engagement and disengagement via oil shear upon proper movement of engagement member 170 as will be discussed below.

An actuator 172 is disposed between clutch control housing 32 and clutch 26. The main body of actuator 172 is made form a non-magnetic material such as aluminum. A spirally wound steel core 173 is contained and secured in a cavity 175 located towards the side of actuator 172 nearest AC voltage clutch coils 194. Actuator 172 is located in an annular recess 174 around the inner periphery of annular housing section 36 and includes a cylindrical extending portion 176 extending towards clutch 26. Cylindrical extending portion 176 has an external surface 178 upon which bearing 180 is mounted. Engagement member 170 has an internal bore 182 within which bearing 180 is disposed. The external surface 184 of engagement member 170 is provided with a plurality of circumferentially spaced spline teeth for engagement with splines 150 of extended annular portion 148. Thus, engagement member 170 moves axially with actuator 172 to engage and disengage clutch 26. A plurality of coil springs 186 are disposed within a plurality of circumferentially spaced cylindrical bores 188 located within clutch control housing 32. Coil springs 186 are positioned such that actuator 172 is biased to the left as shown in FIG. 1 thus engaging clutch 26 through engagement member 170 which moves axially within annular recess 174.

Clutch control housing 32 is made from a non-magnetic material such as aluminum and further defines an annular coil cavity 192 located radially outward from cylindrical bores 188. Disposed within coil cavity 192 are at least three AC voltage clutch coils 194. AC voltage clutch coils 194 are secured within coil cavity 192 with epoxy. Upon application of power to the AC voltage clutch coils 194, a flux field is formed between coils 194 and steel core 173 contained in actuator 172. Actuator 172 is thus magnetically attracted and moves axially with engagement member 170 to the right as shown in FIG. 1. The magnetic attraction of AC clutch coils 194 overcomes the spring force of the plurality of coil springs 186. In this position, clutch 26 is released. When the power to clutch coils 194 is terminated, coil springs 186 urge the actuator 172 and engagement member 170 to the left as shown in FIG. 1, engaging clutch 26.

Encoder 28 is secured to clutch control housing 32 by using an adaptor 200 which is bolted to clutch control housing 32 by the plurality of bolts 64. Encoder 28 receives its rotational information via a control rod 202 which telescopically engages extended portion 154 of cylindrical power transmitting member 132. Control rod 202 is held in place rotationally and axially by a bolt 204 and a keeper 206. The opposite end of control rod 202 is connected to a flexible coupling 203. Input to encoder 28 is transmitted by input control rod 205 which is also connected to flexible coupling 203. The opposite end of control rod 205 provides input to encoder 28. Encoder 28 has an output of 2000 counts per revolution. A 4-times divider circuit increases the effective counts to 8000 per revolution. Thus the encoder is capable of accurately predicting the rotative position of the main motor shaft 20 which in turn identifies the position of the driven apparatus.

While various modes of operation will be explained, it is to be understood that these are not the only modes of operation available and a person skilled in the art would be capable of defining other modes without departing from the proper scope and fair meaning of the present invention. One of the advantages of the present invention is that when power is lost, the main motor drive unit 10 and the two-speed drive unit 12 are both brought to a stop by the application of secondary motor brake 24 and the engagement of clutch 26.

Figure 5:
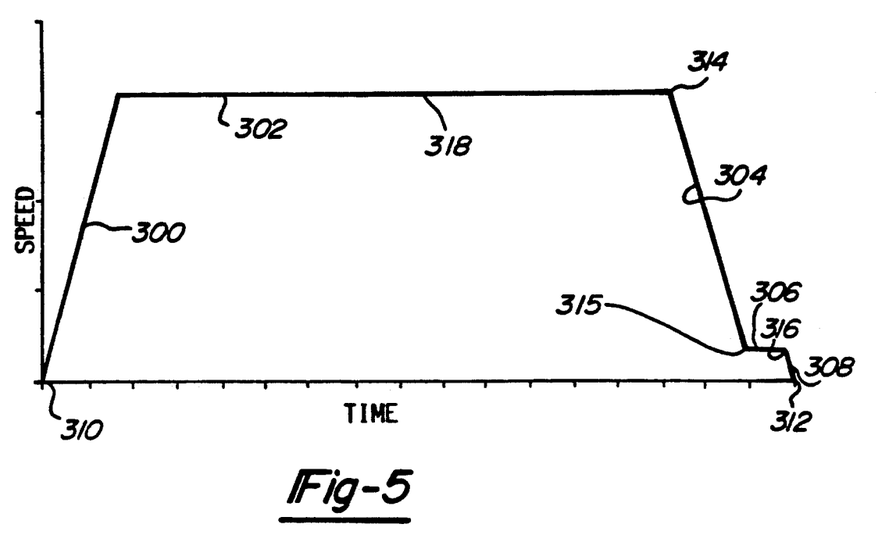
FIG. 5 is a motion diagram of a typical cycle which can be obtained utilizing the two speed drive apparatus of the present invention.

The first mode of operation is for precision indexing. When a machine cycle is to be changed, the controlling computer must be "taught" the positions at which the various functions are to be changed. The motion diagram in FIG. 5 represents a typical motion curve achievable with the two speed drive unit of the present invention. The motion diagram in FIG. 5 comprises five stages of motion, an initial acceleration stage 300, a high speed stage 302, a high speed deceleration stage 304, a low speed stage 306 and a low speed deceleration stage 308. The start position 310 and the stop position 312 are programmed into the computer and are fixed. The controlling computer must be "taught" the positions where the various functions are to change in order to achieve point 312 in both a timely and accurate manner.

The point 314, where the high speed stage 302 ends, is the point where the main motor drive unit 10 is disconnected and the clutch 26 is engaged. Prior art determines this point by using a limit switch. This means the position of the stop command is fixed and the actual stop position for main motor drive unit 10 is a variable caused by external factors including the temperature of the clutch 26 and friction of the driven machine. The present invention allows the stop command to be a variable. This greatly enhances the stopping accuracy of the system by nullifying the exterior factors including the effect of temperature and machine friction. Encoder 28 mounted integral with the two-speed drive unit 12 keeps track of the driven member at all times. To "teach" the system, the controls are set to a LEARNING mode. The high speed offset point 314 is set at approximately ½ of the total cycle time shown in FIG. 5 or approximately at point 318 for the first cycle of operation. This insures that the machine will slowly approach the final stopping point 312. On each subsequent cycle, the high speed offset time is reduced by 75% from the previous cycle's time. The high speed offset time is defined as the time from which the output shaft has reached low speed, point 315 in FIG. 5, to the time the final stop command is given, point 316 in FIG. 5. This reduction in the amount of high speed offset time by cycling of the machine continues until the high speed offset time is between 250 milliseconds and 500 milliseconds. The machine is now ready for continuous operation. As the machine continues to run, the high speed offset time is constantly monitored and any required adjustments are automatically made to keep the high speed offset time between 250 milliseconds and 500 milliseconds.

When the machine is stopped for a period of time, this stoppage can effect the operation and accuracy of the machine. When a forward or reverse command is received by the control computer within less than 60 minutes of the previous cycle, the same offsets and commands of the previous cycle are still considered valid and are used. When a forward or reverse command is received more than 60 minutes after the previous cycle, the high speed offset time is preset to a value of 4 times the high speed offset time of the previous cycle. On each subsequent cycle, the high speed offset time is reduced by 75% from the previous cycle until the high speed offset time again reaches the 250 millisecond to 500 millisecond range.

In operation, beginning with both motors 10 and 22 at rest, power is simultaneously provided to main motor drive 10, secondary motor 22, clutch coils 194 and secondary motor brake 24. The drive accelerates according to acceleration stage 300 in FIG. 5. Main motor drive 10 is free to operate without being affected by two-speed drive unit 12 due to the disengagement of clutch 26 by application of power to clutch coils 194. Secondary motor 22 is also free to operate independent of main motor drive 10 due to the disengagement of clutch 26 and the release of secondary motor brake 24. The drive is now operating in the high speed stage 302. When the machine reaches the self-taught stopping point 314, power to main motor drive 10 and clutch coils 194 are terminated to affect a braking of main motor drive 10 from its full speed to the gear reduced speed of two-speed drive unit 12 as clutch 26 reduces the full speed of main motor shaft 20 of main motor drive 10 to the gear reduced speed of two-speed drive unit 12. This deceleration stage is shown as stage 304 in FIG. 5 and ends at point 315. Two-speed drive unit 12 can then continue to slowly move main motor shaft 20 and low speed stage 306 is entered. When the machine reaches self-taught stopping point 316, power will be terminated to both secondary motor 22 and secondary motor brake 24 bringing main motor shaft 20 to a stop, as shown by low speed deceleration stage 308.

The controlling computer looks at the actual functional changing positions after each cycle and makes any corrections necessary for the next cycle. The computer program automatically maintains the time the machine will be in the low speed stage 306 before the final stop command to between 250 and 500 milliseconds. The computer will then not only calculate when the stop command, point 316, is to be initiated but it will also determine when the slow down command is to be initiated, point 314, in order to maintain the required time interval for low speed stage 306.

While the above description utilizes a two stopping position EPROM, EPROM's can be furnished with up to 20 stopping positions which gives them great flexibility in many automation applications.

Figure 6:
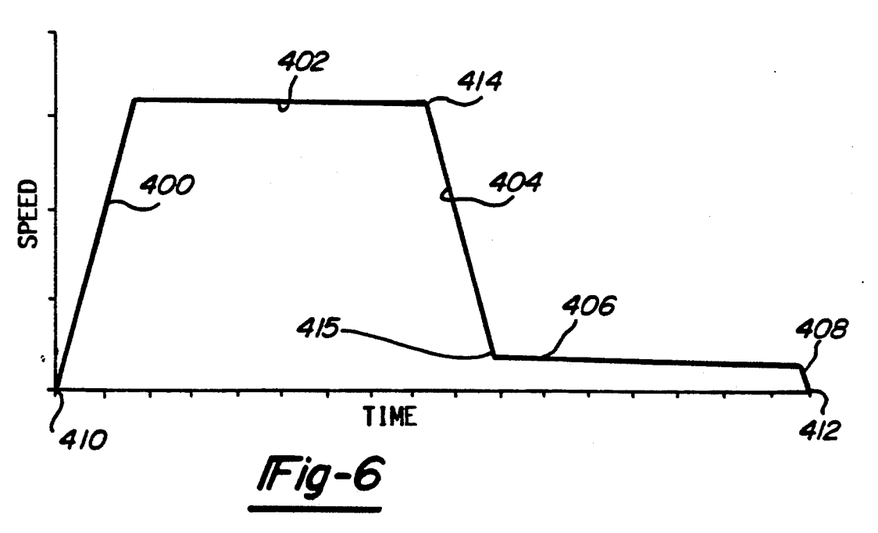
FIG. 6 is a motion diagram of another typical cycle which can be obtained utilizing the two speed drive apparatus of the present invention.

Another mode of operation is again to use the two speed capabilities of the two speed drive. Again, prior to operation of a cycle, the controlling computer must be "taught" the positions at which functions are to be changed. The motion diagram in FIG. 6 represents an additional motion curve achievable with the two speed drive unit of the present invention. The motion diagram in FIG. 6 also comprises five stages of motion, an initial acceleration stage 400, a high speed stage 402, a high speed deceleration stage 404, a low speed stage 406 and a low speed deceleration stage 408. The difference between the motion diagram in FIG. 6 compared to that in FIG. 5 is the length of the low speed stage 406.

In applications similar to FIG. 6 where the two-speed drive is to be used as a feed drive, the controlling computer is simply supplied with a different EPROM. The sequence for the mode of operation shown in FIG. 6 is identical to that of the mode described for FIG. 5 as it applies to the "teaching" of the computer with the addition of the inputting of point 415. Instead of maintaining the time of slow speed operation to between 250 and 500 milliseconds, the computer now calculates where point 414 must be located in order for the drive to reach preset point 415. Once the computer has gone through the initial learning stage for locating point 414, the operation of the machine continues similar to that described for FIG. 5 with the computer constantly evaluating the results of the stopping position 314 and adjusting it accordingly to maintain point 415.

The additional modes discussed below can also utilize the two-speed drive unit's controlling computer by plugging in the appropriate EPROM into the computer or by switching to a manual mode.

An additional mode, beginning with both motors 10 and 22 at rest, would be to simultaneously provide power to both main motor drive 10 and clutch coil 194. The main motor drive 10 is then free to operate without being affected by two-speed drive unit 12 due to the disengagement of clutch 26 by application of power to clutch coil 194. When power to the main motor drive 10 is terminated, a controlled reduction of the voltage can be applied to clutch coil 194 to affect a programmed breaking as clutch 26 reacts through two-speed drive unit 12 and secondary motor brake 24.

An additional operational mode, again beginning with both motors 10 and 22 at rest, would be to simultaneously provide power to secondary motor 22, clutch coil 194 and secondary motor brake 24. Secondary motor 22 is then free to operate independent of main motor 10 due to the release of secondary motor brake 24 and the disengagement of clutch 26. Two-speed drive unit 12 can then be systematically connected to main shaft 20 by terminating the voltage to clutch coil 194 which will engage clutch 26 and allow two-speed drive unit 12 to slowly move main shaft 20.

Figure 7:
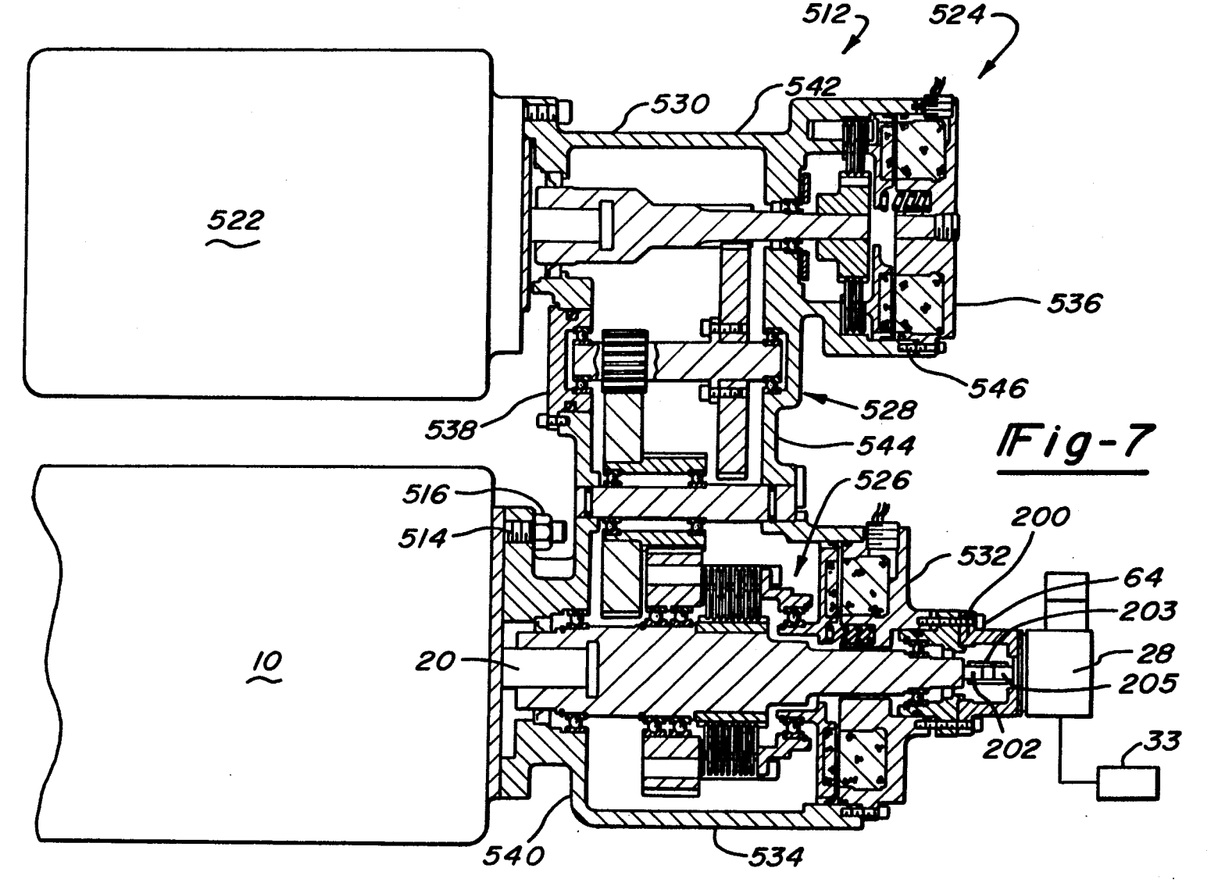
FIG. 7 is a longitudinal side sectional view partially in cross section of a two-speed drive unit in accordance with another embodiment of the present invention.
Figure 8:
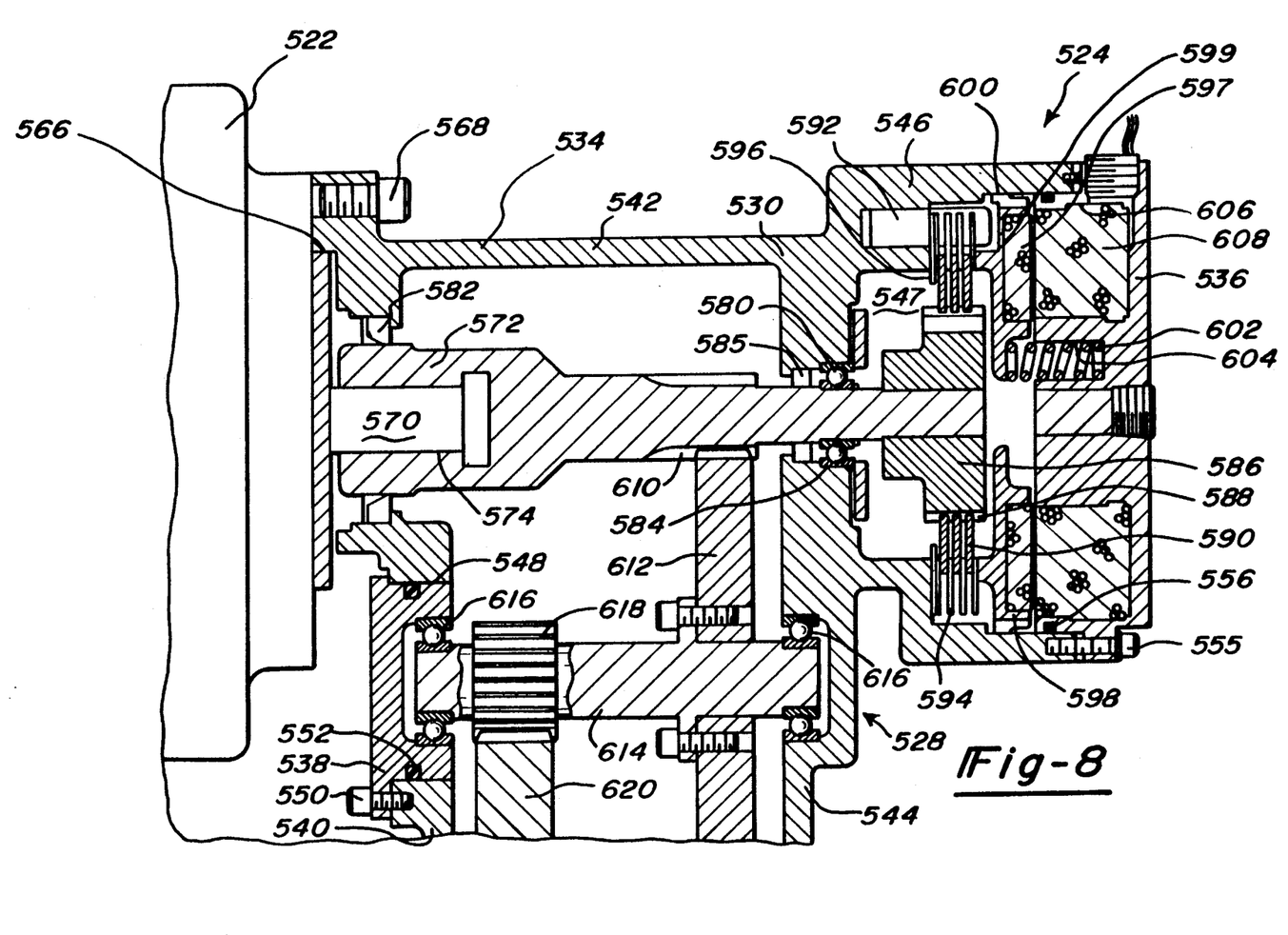
FIG. 8 is an enlarged view of the gearing and external brake for the two-speed drive unit shown in FIG. 7.
Figure 9:
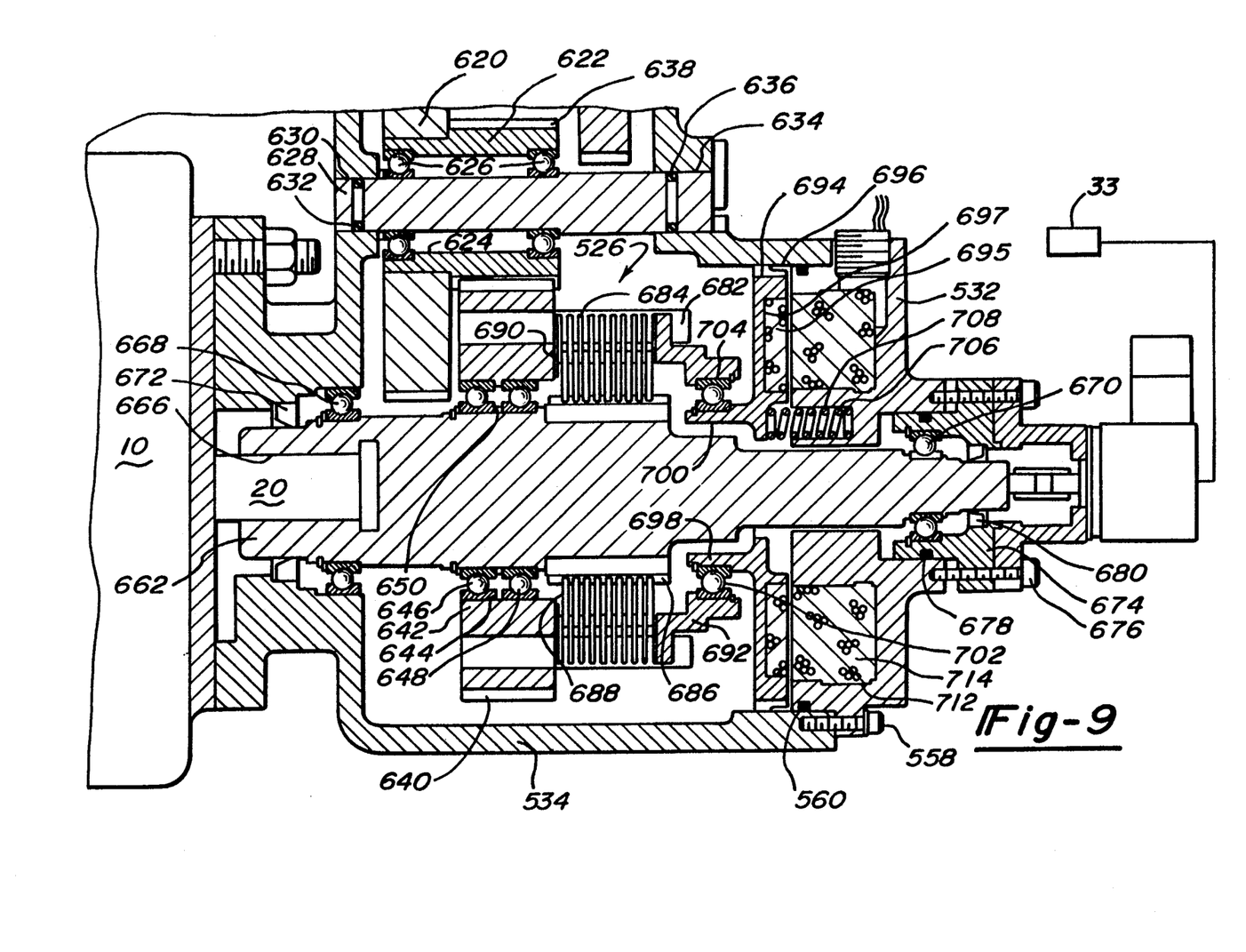
FIG. 9 is an enlarged view of the oil submerged clutch for the two speed drive unit shown in FIG. 7.

Referring now to FIGS. 7 through 9, main motor drive 10 is illustrated incorporating a two-speed drive unit 512 in accordance with another embodiment of the present invention. Two speed drive unit 512 is secured to the rear of main motor drive 10 by a plurality of circumferentially spaced studs 514 and nuts 516.

Two-speed drive unit 512 comprises a secondary motor 522, a secondary motor brake 524, a clutch 526 for engaging secondary motor 522 with the rear of main motor shaft 20 of main motor drive unit 10 to drive a machine (not shown) via main motor shaft 20, a controlling computer (not shown) which is in communication with encoder 28 for determining the position of the member driven by main motor shaft 20 at all times and a gear train 528 positioned between secondary motor 522 and clutch 526 for reducing the speed between the two. Clutch 526 is enclosed by an oil-filled housing assembly 530 comprised of a clutch control housing 532, an intermediate housing 534, a brake control housing 536 and an end cap 538. Intermediate housing 534 is formed by a first end wall 540, an annular wall 542, a second end wall 544 and an annular brake housing 546. Intermediate housing 534 is secured to main motor 10 by studs 514 and nuts 516 as described above. End cap 538 is located in a bore 548 extending through first end wall 540 and is secured to first end wall 540 by a plurality of circumferentially spaced bolts 550 and a suitable oil seal 552. Brake control housing 536 is secured to the open end of brake housing 546 by a plurality of circumferentially spaced bolts 555 and a suitable oil seal 556. Secondary motor brake 524 is located within the sealed oil-filled chamber 547 formed by brake control housing 536, brake housing 546 and second end wall 544. Clutch control housing 532 is secured to intermediate housing 534 by a plurality of circumferentially spaced bolts 558 and a suitable oil seal 560.

Secondary motor 522 is located in a bore 566 extending through first end wall 540 and is secured to end wall 540 by a plurality of bolts 568. Secondary motor 522 has a motor shaft 570 extending into housing assembly 530. Motor shaft 570 telescopically engages an interior driveshaft 572 via a keyway 574 on motor shaft 570. Interior shaft 572 is rotatably mounted within housing assembly 530 by a bearing 580 and appropriately sealed at the secondary motor end by a seal 582. Bearing 580 is mounted in a bore 584 in second end wall 544. Interior shaft 572 extends through bearing 580 into sealed chamber 547 and is sealed at bore 584 by an appropriate seal 585.

Secondary motor brake 524 is located opposite of secondary motor 522 and includes annular drive member 586 fixedly secured to interior shaft 572. Annular drive member 586 has a plurality of longitudinally extending circumferentially spaced splines 588 disposed at the radial outer periphery thereof. A series of friction brake plate members, generally designated 590, are each provided with internal splines complementary to splines 588 and adapted for splined engagement therewith. Annular brake housing 546 has a plurality of longitudinally extending drive lugs 592 disposed at circumferentially spaced locations along the inner periphery thereof. A second series of friction brake plates, generally designated 594, are each provided with a plurality of circumferentially spaced, radially inwardly extending notches adapted for keyed engagement with drive lugs 592. In assembly, brake plates 590 and 594 are interleaved between an abutment surface 596 and an actuator 598 to be capable of application and release via oil shear upon proper movement of actuator 598.

Actuator 598 is made from a non-magnetic material such as aluminum. A spirally wound steel core 597 is contained and secured in a cavity 599 located towards the side of actuator 598 nearest AC voltage brake coil 608. Actuator 598 is located in an annular recess 600 around the inner periphery of annular brake housing 546. A plurality of coil springs 602 are disposed within a plurality of circumferentially spaced cylindrical bores 604 within brake control housing 536. Coil springs 602 are positioned such that actuator 598 is biased to the left as shown in FIG. 8 thus applying secondary motor brake 524 by the axial movement of actuator 598 within annular recess 600.

Brake control housing 536 is made from a non-magnetic material such as aluminum and further defines an annular coil cavity 606 located radially outward from cylindrical bores 604. Disposed within coil cavity 606 are at least three AC voltage brake coils 608. AC voltage brake coils 608 are secured within coil cavity 606 with epoxy. Upon application of power to AC voltage brake coils 608, a flux field is formed between coils 608 and steel core 597 contained in actuator 598. Actuator 598 is thus magnetically attracted to brake coils 608 and actuator 598 moves axially to the right as shown in FIG. 8. The magnetic attraction of AC clutch coils 608 overcomes the spring force exerted by the plurality of coil springs 602 and thus releases secondary motor brake 524. When the power to brake coils 608 is terminated, coil springs 602 urge actuator 598 to the left as shown in FIG. 8, applying brake 524.

Interior driveshaft 572 further includes a pinion gear 610 disposed between brake 524 and secondary motor 522. Pinion gear 610 is rotatable with interior driveshaft 572 and is meshed with gear train 528. Pinion gear 610 meshes with a first gear 612 which is fixedly secured to a first idler shaft 614, wherein pinion gear 610 rotatably drives idler shaft 614. Idler shaft 614 is rotatably mounted within housing assembly 530 by a pair of bearings 616. One of the pair of bearings 616 is mounted in second end wall 544 and the other is mounted in end cap 538.

Idler shaft 614 has a second gear 618 fixedly disposed at the outer periphery thereof, rotatable with idler shaft 614, axially spaced from first gear 612 and generally having a different (smaller) diameter than first gear 612. Second gear 618 meshingly engages a third gear 620 which is mounted on a sleeve 622 wherein second gear 618 rotatably drives sleeve 622 via third gear 620. Sleeve 622 has an internal bore 624 within which a pair of bearings 626 are disposed. A non-rotating support shaft 628 extends from a bore 630 having a suitable seal 632 in first end wall 540, through bearings 626 and into a bore 634 also having a seal 636 in oppositely disposed second end wall 544 of housing assembly 530 to support sleeve 622.

Sleeve 622 has a fourth gear 638 at the outer periphery thereof, rotatable with sleeve 622, axially spaced from third gear 620, and generally having a different (smaller) diameter than third gear 620. Fourth gear 638 meshingly engages the teeth 640 of a first annular member 642 of clutch 526. First annular member 642 has an interior bore 644 within which is disposed a pair of bearings 646 and 648 separated by a spacer 650. Bearings 646 and 648 are mounted on the outer periphery of a cylindrical power transmitting member 662.

Cylindrical power transmitting member 662 encapsulates and is connected to main motor shaft 20 via keyway 666. Cylindrical member 662 is rotatably mounted within housing assembly 530 by bearings 668 and 670. Bearing 668 is mounted in a first end wall 540 of housing assembly 530. An appropriate seal 672 is provided between end wall 540 and cylindrical member 662. Bearing 670 is mounted in a bearing preload cap 674 fixedly attached to clutch control housing 532 by a plurality of circumferentially spaced bolts 676 and an appropriate seal 678. An appropriate seal 680 is provided between preload cap 674 and cylindrical member 662. Cylindrical member 662 extends through bearing 670 and seal 680 to rotatably mate with control rod 202, flexible coupling 203 and input control rod 205 for encoder 28. The operation and function of encoder 28 is identical to that described above for FIGS. 1 through 4.

Clutch 526 includes a plurality of longitudinally extending drive lugs 682 circumferentially spaced and extending from first annular member 642. A series of friction clutch plate members, generally designated 684, are each provided with a plurality of circumferentially spaced radially inwardly extending notches adapted for keyed engagement with drive lugs 682.

Cylindrical power transmitting member 662 includes a plurality of longitudinally extending circumferentially spaced splines 686 disposed at the radially outer periphery thereof. A series of friction clutch disc members, generally designated 688, are provided having internal splines complimentary to splines 686 and adapted for splined engagement therewith. In assembly, clutch plates 684 and clutch discs 688 are interleaved between an abutment surface 690 and an engagement member 692 to be capable of engagement and disengagement via oil shear upon proper movement of engagement member 692 as will be discussed below.

An actuator 694 is disposed between clutch control housing 532 and clutch 526. The main body of actuator 694 is made from a non-magnetic material such as aluminum. A spirally wound steel core 695 is contained and secured in a cavity 697 located towards the side of actuator 694 nearest AC voltage clutch coils 714. Actuator 694 is located in an internal cylindrical surface 696 of intermediate housing 534 and includes a cylindrical extending portion 698 extending towards clutch 526. Cylindrical extending portion 698 has an external surface 700 upon which bearing 702 is mounted. Engagement member 692 has an internal bore 704 within which bearing 702 is disposed. The external surface of engagement member 692 is provided with a plurality of circumferentially spaced, radially inwardly extending notches adapted for keyed engagement with drive lugs 682. Thus, engagement member 692 moves axially with actuator 694 to engage and disengage clutch 526. A plurality of coil springs 706 are disposed within a plurality of circumferentially spaced cylindrical bores 708 located within clutch control housing 532. Coil springs 706 are positioned such that actuator 694 is biased to the left as shown in FIG. 9 thus engaging clutch 526 through engagement member 692 which moves axially along cylindrical surface 696.

Clutch control housing 532 is made from a non-magnetic material such as aluminum and further defines an annular coil cavity 712 located radially outward from cylindrical bores 708. Disposed within coil cavity 712 are at least three AC voltage clutch coils 714. AC voltage clutch coils 714 are secured within coil cavity 712 with epoxy. Upon application of power to AC voltage clutch coils 714, a flux field is formed between coils 714 and steel core 695 contained in actuator 694. Actuator 694 is thus magnetically attracted and moves axially with engagement member 692 to the right as shown in FIG. 9. The magnetic attraction of AC clutch coils 714 overcomes the spring force of the plurality of coil springs 706. In this position, clutch 526 is released. When the power to clutch coils 714 is terminated, coil springs 706 urge actuator 694 and engagement member 692 to the left as shown in FIG. 9, engaging clutch 26.

Encoder 28 is secured to clutch control housing 532 by using adaptor 200 and the plurality of bolts 64 similar to that shown in the embodiments presented in FIGS. 1–4 above. The operation and the various modes of operation discussed above for the embodiment presented in FIGS. 1–4 are the same for this embodiment.

While it will be apparent that the preferred embodiment as illustrated herein is well calculated to fulfill the objects above stated, it will also be appreciated that the present invention is susceptible to modification, variation and change without departing from the proper scope and fair meaning of the subjoined claims.

What is claimed is:

1. A two-speed drive unit in combination with an apparatus having a main housing and a main shaft operably associated with said main housing, said two-speed drive unit comprising:
   a two-speed drive housing secured to said main housing of said apparatus;
   secondary motor means for driving said two-speed drive unit, said secondary motor means having a drive shaft extending therefrom, said secondary motor means secured to said two-seed drive housing such that said driveshaft of said secondary motor means extends into said two-speed drive housing;
   brake means operably associated with said secondary motor means, said brake means engaging said driveshaft to hold said driveshaft in a non-rotatable position when said brake means is in an applied condition;
   clutch means disposed between said secondary motor means and said main shaft for selectively engaging and disengaging said secondary motor means and said main shaft;
   gear reduction means disposed within said two-speed drive housing between said secondary motor means and said clutch means, said gear reduction means operably associated with said secondary motor drive shaft and said clutch means; and
   means operably associated with said two-speed drive unit for selectively controlling said apparatus, said secondary motor means said clutch means, and said brake means, said selectively controlling means being continuously self-adjusting in order to maintain a pre-specified speed versus time relationship of said two speed drive unit.

2. The two-speed drive unit of claim 1 wherein said clutch means comprises:
   an AC voltage clutch coil disposed within said two-speed drive housing; and
   a movable pressure plate operably associated with said AC voltage clutch coil wherein movement of said pressure plate in a first direction engages said gear reduction means with said main shaft, and movement of said pressure plate in a second direction disengages said gear reduction means from said main shaft.

3. The two-speed drive unit of claim 1 wherein said brake means comprises an electro-shear brake; said electro-shear brake operating at least partially immersed in oil.

4. The two-speed drive unit of claim 1 wherein said selectively controlling means comprises:
   an encoder operably associated with said main shaft of said apparatus for determining rotative position of said main shaft;
   computer means in communication with said encoder for selectively controlling said apparatus, said secondary motor means and said clutch means to position said apparatus in at least one predetermined position.

5. The two-speed drive unit of claim 4 wherein said computer means 33 continually adjusts said at least one predetermined position based upon information received during at least one prior cycle of operation of said apparatus.

6. The two-speed drive unit of claim 4 wherein said computer means has Erasable Programmable Read Only Memory (EPROM) for storing said at least one predetermined position.

7. A two-speed drive unit in combination with an apparatus having a housing and a main rotatable member operably associated with said housing, said two-speed drive unit comprising:
   a two-speed drive housing secured to said housing of said apparatus, said two-speed drive housing have a first and second portion;
   secondary motor means for driving said two-speed drive unit, said secondary motor means having a driveshaft extending therefrom, said secondary motor means being secured to said second portion of said two-speed drive housing such that said driveshaft of said secondary motor means extends into said second portion of said two-speed drive housing;
   first gear means disposed within said second portion of said two-speed drive housing, said first gear means fixedly secured to said drive shaft of said secondary motor means;
   second gear means rotatably disposed within said first portion of said two-speed drive housing, said second gear means operably engaged with said first gear means to be driven by said first gear means, said second gear means fixedly secured to an intermediate shaft for rotation therewith;
   third gear means fixedly secured to said intermediate shaft for rotation therewith, said third gear means being spaced from said second gear means and disposed within said first portion of said two speed drive housing;
   fourth gear means rotatably disposed within said first portion of said two speed drive housing and extending into said second portion of said two speed drive housing, said fourth gear means operably engaged with said third gear means to be driven by said third gear means;
   a sleeve rotatably disposed within said second portion of said two-speed drive housing, said sleeve fixedly secured to said fourth gear means for rotation therewith;
   fifth gear means disposed on said sleeve and rotatable therewith, said fifth gear means spaced apart from said fourth gear means and disposed within said second portion of said two-speed drive housing;

sixth gear means rotatably disposed within said second portion of said two-speed drive housing, said sixth gear means operably engaged with said fifth gear means to be driven by said fifth gear means;

clutch means for selectively engaging said sixth gear means with said main rotatable member, said clutch means operatively disposed between said sixth gear means and said main rotatable member such that engagement of said sixth gear means with said main rotatable member permits said secondary motor means to drive said main rotatable member of said apparatus; and means operably associated with said two-speed drive unit for selectively controlling said apparatus, said secondary motor means and said clutch means.

8. The two-speed drive unit of claim 7 wherein said clutch means comprises:

an AC voltage clutch coil disposed within one of said first or second portions of said two-speed drive housing; and a movable pressure plate operably associated with said AC voltage clutch coil wherein movement of said pressure plate in a first direction engages said fourth gear means with said main rotatable member, and movement of said pressure plate in a second direction disengages said fourth gear means from said main rotatable member.

9. The two-speed drive unit of claim 7 wherein said main rotatable member and said sleeve have parallel axes of rotation.

10. The two-speed drive unit of claim 7 further comprising an electro-shear brake operably associated with said secondary drive motor; said electro-shear brake engaging said drive shaft to hold said driveshaft in a non-rotatable position when said electro-shear brake is in an applied condition.

11. The two-speed drive unit of claim 10 wherein said selectively controlling means is operably associated with said secondary drive motor and said electro-shear brake.

12. The two-speed drive unit of claim 7 wherein said selectively controlling means comprises:

an encoder operably associated with said main rotatable member of said apparatus for determining rotative position of said main rotatable member;

computer means in communication with said encoder for selectively controlling said apparatus, said secondary drive means and said clutch means to position said apparatus in at least one predetermined position.

13. The two-speed drive unit of claim 12 wherein said computer means continually adjusts said at least one predetermined position based upon information received during at least one prior cycle of operation of said apparatus.

14. The two-speed drive unit of claim 12 wherein said computer means has Erasable Programmable Read Only Memory (EPROM) for storing said at least one predetermined position.

15. A two-speed drive unit in combination with an apparatus having a main housing and a main shaft operably associated with said main housing, said two-speed drive unit comprising:

a two-speed drive housing secured to said main housing of said apparatus;

secondary motor means for driving said two-seed drive unit, said secondary motor means having a drive shaft extending therefrom, said secondary motor means secured to said two-speed drive housing such that said driveshaft of said secondary motor means extends into said two-speed drive housing;

brake means operably associated with said secondary motor means, said brake means engaging said driveshaft to hold said driveshaft in a non-rotatable position when said brake means is in an applied condition;

clutch means disposed between said secondary motor means and said main shaft for selectively engaging and disengaging said secondary motor means and said main shaft;

gear reduction means disposed within said two-speed drive housing between said secondary motor means and said clutch means, said gear reduction means operably associated with said secondary motor drive shaft and said clutch means;

an encoder operably associated with said main shaft of said apparatus for determining rotative position of said main shaft; and computer means in communication with said encoder for selectively controlling said apparatus, said secondary motor means and said clutch means to position said apparatus in at least one predetermined position.

* * * * *

UNITED STATES PATENT AND TRADEMARK OFFICE
CERTIFICATE OF CORRECTION

PATENT NO. : 5,323,888

DATED : June 28, 1994

INVENTOR(S) : Gordon M. Sommer

It is certified that error appears in the above-indentified patent and that said Letters Patent is hereby corrected as shown below:

Col. 2, Line 20, "4014 60" should be --40-60--;

Col. 4, Line 49, "form" should be --from--;

Col. 10, Line 32, "complimentary" should be --complementary--;

Col. 11, Line 35, Claim 1, "two-seed" should be --two speed--;

Col. 11, Line 55, Claim 1, "means (first occurence) should be --means,--;

Col 12, Line 18, Claim 5, "means 33" should be --means--;and

Col. 14, Line 19, Cliam 15, "two-seed" should be --two-speed--.

Signed and Sealed this

Thirteenth Day of December, 1994

Attest:

BRUCE LEHMAN

*Attesting Officer*           *Commissioner of Patents and Trademarks*